C. SCHOCK.
FOOD CHOPPER.
APPLICATION FILED SEPT. 29, 1913.
1,130,025.
Patented Mar. 2, 1915.
3 SHEETS—SHEET 2.
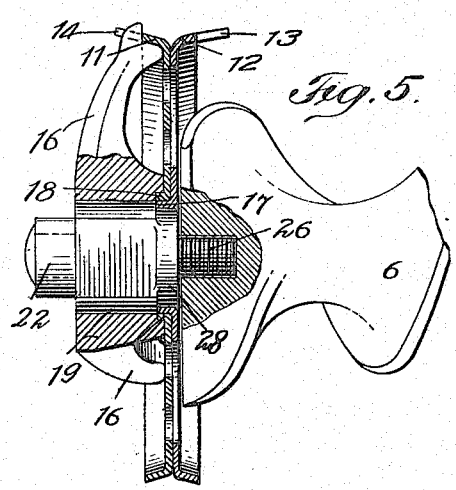
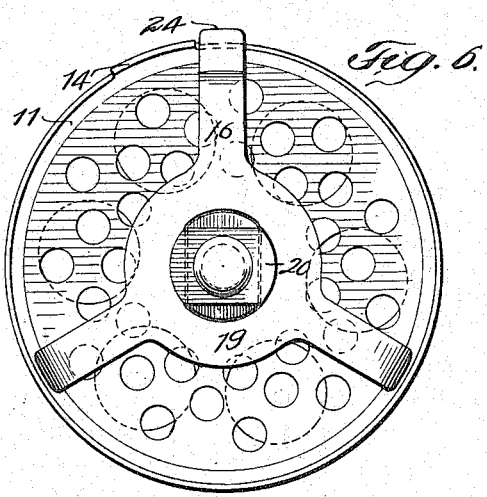
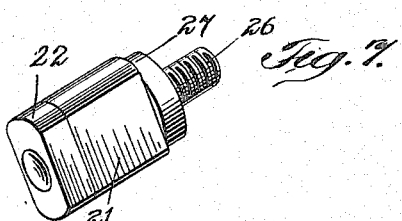
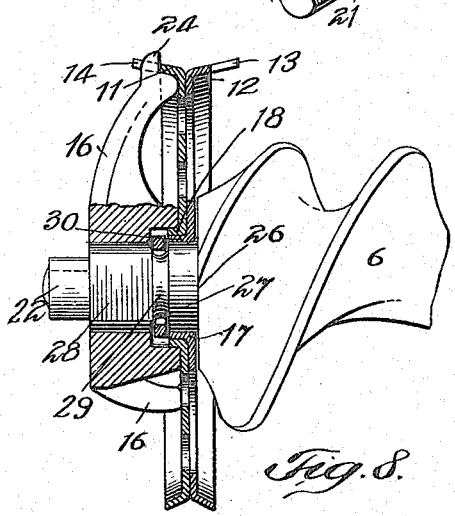
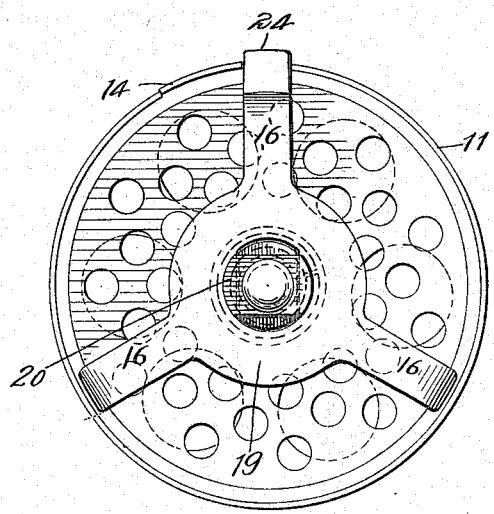

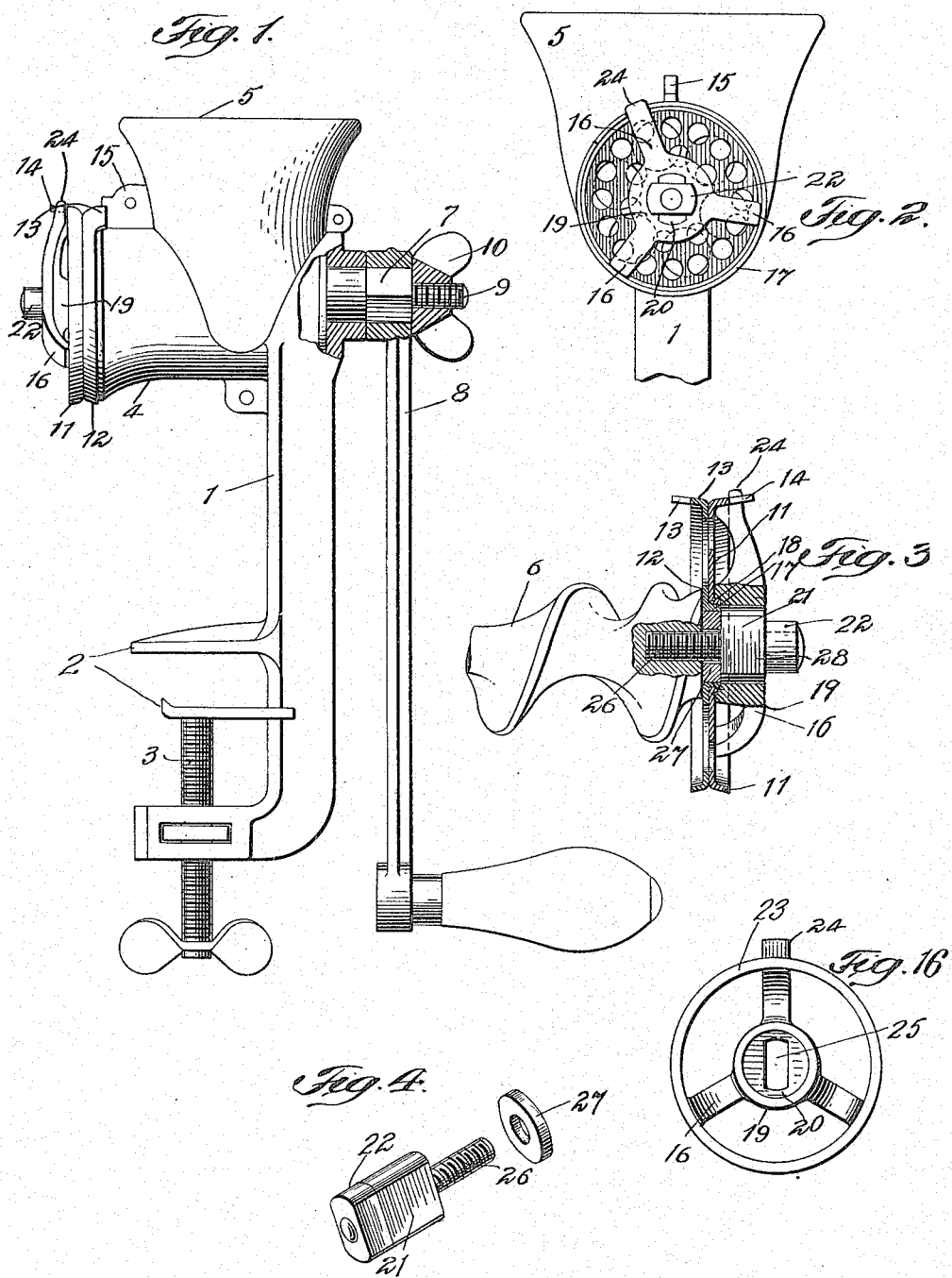

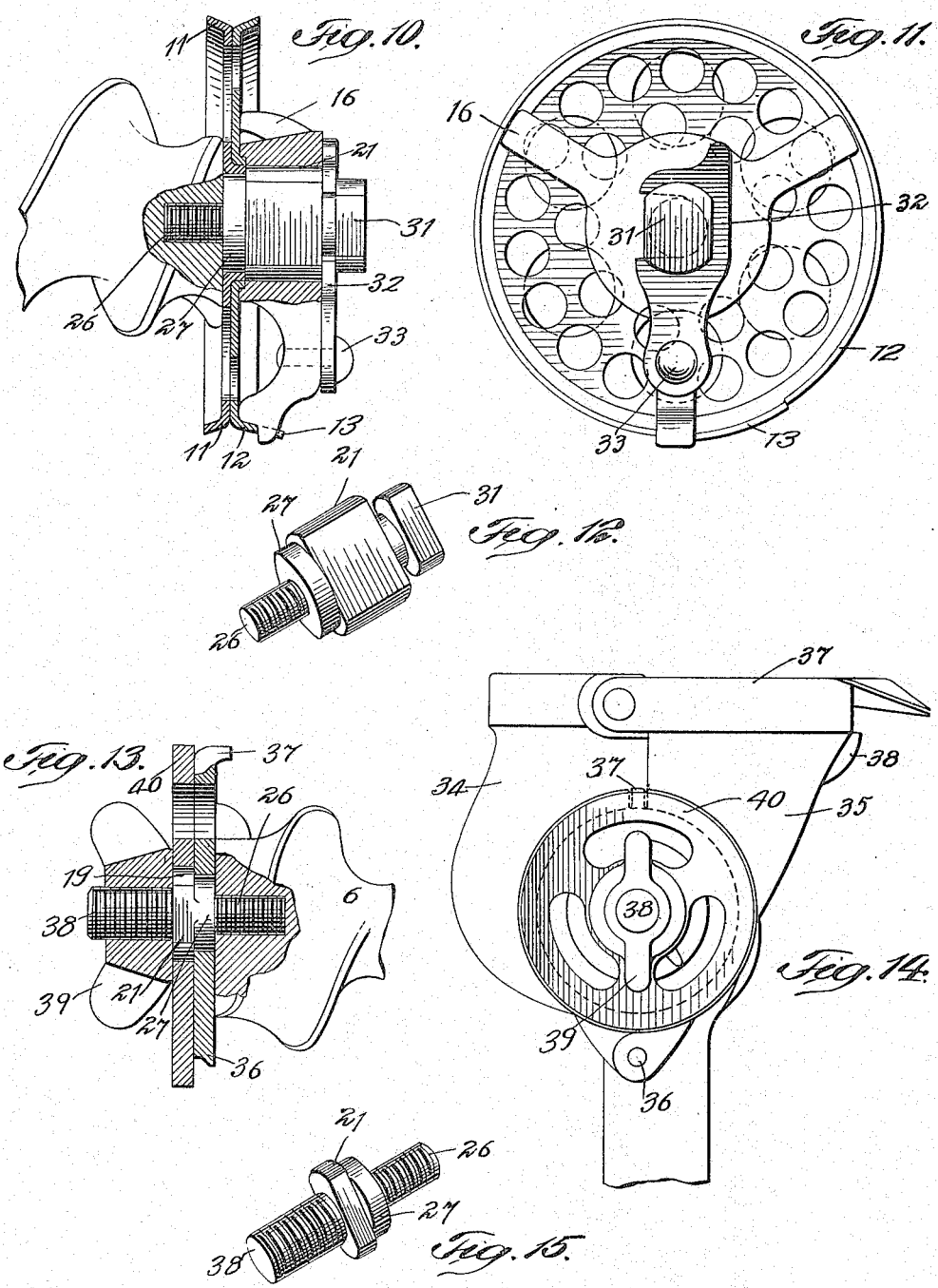

UNITED STATES PATENT OFFICE.

CLARENCE SCHOCK, OF MOUNT JOY, PENNSYLVANIA.

FOOD-CHOPPER.

1,130,025.　　　　Specification of Letters Patent.　　Patented Mar. 2, 1915.

Application filed September 29, 1913.　Serial No. 792,315.

*To all whom it may concern:*

Be it known that I, CLARENCE SCHOCK, residing at Mount Joy, in the county of Lancaster and State of Pennsylvania, have invented certain new and useful Improvements in Food-Choppers, of which the following is a specification.

This invention relates to food choppers and has for its objects the production of a food chopper in which provisions are made against incorrect assembling of the parts.

Food choppers in which my invention is particularly useful usually comprise a standard or support having fastening means for securing the chopper to an edge of a table or shelf, a barrel and a hopper therefor, a rotary worm or forcer arranged to rotate in the barrel to coöperate with ribs formed in the side of the same to partly disintegrate the food and to force it past cutters on one end of the barrel, a suitable operating handle for the worm, and cutters on the front end of the barrel, one of which is operated through the worm to chop the food as it is forced through them. Such choppers are usually made to operate upon different kinds of foods, and interchangeable cutters are usually provided for this purpose. The worm or forcer is assembled in the barrel and with the cutters on the ends of the barrel and worm, so that they may be readily disassembled for cleaning purposes. In the use of a plurality of interchangeable cutters there is an opportunity for incorrect assembling of the parts by servants, and the like, mechanically ignorant persons, who usually operate such devices.

The invention provides means for fixedly securing the inner cutter to the worm so that it may be held stationary with respect to the barrel and for holding the outer cutter in position on the worm so that it may be revolved with respect to the inner cutter to chop the food.

The invention also provides means for preventing the incorrect assembling of the outer cutter through the production of a retaining device for the inner cutter either integral with the forcer or separately manufactured and securely attached thereto.

The invention is useful in connection with any food chopper having both rotary and stationary cutters, but is described as used in combination with concavo-convex resilient reinforced cutter disks of the type described in my co-pending application, Serial No. 792,314, filed September 29, 1913.

The invention has also for an object the production of a fastening device for disks which firmly secures them in operative contact in order that they may effectually perform their shearing operation.

With the above and other objects in view, the invention comprises a food chopper having a worm and forcer of any desired construction and a retaining device for the inner cutter arranged to secure the inner cutter to the worm so that it may not be readily removed therefrom, but in such manner that the worm may rotate relative thereto, so that such inner cutter may be held stationary during the operation of the machine.

The invention also comprises a retaining device for the inner cutter and additional means for securing the outer cutter in place. The retaining device may be provided with different forms of locking elements for securing the outer disk in operative position with respect to the inner disk and for associating it with the worm, and it is also provided with suitable bearings for the disks, all as more fully hereinafter set forth and as claimed.

In the accompanying drawings showing several forms of a specific embodiment of my invention, Figure 1 is a side elevation, partly in section, of an assembled food chopper; Fig. 2 is a front plan view of the cutter end of the barrel; Fig. 3 is a longitudinal section through a part of the worm and cutters and shows one form of the retaining device; Fig. 4 is a perspective view of the form of retaining device shown in Fig. 3; Fig. 5 is a longitudinal section through a worm and cutters and illustrates another form of retaining device; Fig. 6 is a front plan view of Fig. 5; Fig. 7 is a perspective view of the retaining device shown in Fig. 5; Fig. 8 is a longitudinal section through a worm and cutters and illustrates another form of retaining device; Fig. 9 is a front plan view of Fig. 8; Fig. 10 is a longitudinal section through a worm and cutters and illustrates a different form of retaining device; Fig. 11 is a front plan view of Fig. 10; Fig. 12 is a perspective view of the retaining device shown in Fig. 10; Fig. 13 is a longitudinal section through a worm and cutter disks of different form than those shown in the other views, and illustrates the manner in which the invention may be used in connection with a form of chopper different from that shown in Fig. 1; Fig. 14 is a front plan view of the chopper for which the cutters shown in Fig. 13 are adapted; Fig. 15 is a perspective view of the retaining device used for the cutters in Fig. 13; and Fig. 16 is a front plan view of a modified form of yoke.

Referring to the drawings, reference numeral 1 indicates the usual standard having the clamping jaws 2 and fastening screw 3 for securing the chopper to the edge of a table. The barrel 4, with its hopper 5 and worm or forcer 6, may be of the usual construction. The worm has a keyed end 7, over which a correspondingly slotted handle 8 fits, and the screw-threaded end 9 for the winged nut 10, which serves to adjust the outer and inner cutters with respect to each other, as hereinafter pointed out. The outer cutters 11 and inner cutters 12, shown in Figs. 1 to 12, inclusive, are preferably of resilient metal having peripheral flanges which serve to reinforce them. The flange of the inner cutter is provided with a lug 13, and the flange of the outer cutter is provided with a lug 14, the lug on the inner cutter engaging a projection, such as 15, on the barrel of the chopper to prevent such inner cutter from rotating and the lug of the outer cutter engaging an arm 16 of an operating device connected to the worm. The combination of these disks with a food chopper is not claimed as a part of the present invention, but forms the subject-matter of the application hereinbefore referred to. These disks are also provided with central holes and annular bearing flanges, the flange 17 of the inner cutter having an external diameter less than the internal diameter of the flange 18 of the outer cutter, so that the flange of the outer cutter may rotate upon the flange of the inner cutter. The connection 19 extending from the worm is provided with a recess 20 adapted to fit over a corresponding keyed portion 21 on the end of the worm and to be removably secured in position through the nut 22, hereinafter described. This connection is provided with several arms and in one form with a peripheral rim 23, which engages the face of the outer cutter. The rim is provided with an extension 24, which engages the lug 14 of the outer cutter to rotate it as the connection is revolved by the worm. This connection may be made without the rim, in which event one of the arms may be made long enough to engage the lug 14. This connection is provided with the recessed portion 25 adapted to fit over the flange 18 of the outer cutter and thus bear directly against the face of such cutter and to serve as a housing. I do not claim herein the construction of these bearing flanges and the connection, as they form the subject-matter of my co-pending application filed May 21st, 1912, Serial No. 698,708, renewed July 7th, 1913, Serial No. 777,962 patented February 24, 1914, No. 1,088,458.

In Figs. 1, 2, 3 and 4 there is shown one form of retaining device for the stationary cutter. It comprises a screw-threaded extension 26 adapted to be secured in a corresponding hole in the end face of the worm and a separately formed bearing 27, upon which the inner disk rests. The extension 26 is provided with the flattened portions 21 for engagement with the connecting device, as described, and has a diameter through its greatest width slightly greater than the diameter of the bearing 27 and the internal diameter of the flange 17 of the inner cutter. The bearing 27 has a diameter, so that it accommodates the bearing flange 17 of the inner cutter. Thus, the extension 26 serves to retain the inner cutter 12 upon its bearing 27 when the retaining device has been secured to the worm. The internal diameter of the flange 18 of the outer cutter corresponds to the greatest diameter of the extension at 21, so that such outer cutter may be placed in position with its flange bearing on the flange of the inner cutter. When the cutters have been assembled as thus indicated and when the connectiton 19 has been placed in position, the nut 22 is turned cross-wise of the slot 20 of the connection and the worm is placed in the barrel and secured therein by the winged nut 10 at the opposite end, the nut serving to adjust the cutters with respect to each other.

In Figs. 5, 6 and 7 I have shown a slightly modified construction in which the bearing 27 is formed integral with the retaining device. This is a very satisfactory construction, but slightly more expensive than the construction shown in Figs. 1 to 4 in that more care and time are required for the formation of the screw-threads on the extension and for the shaping of the flattened portion of the extension than is required in the construction of the device shown in Fig. 4. In the device previously described the bearing may be stamped, the extension may be cast and readily finished, while the screw may be easily formed.

In Figs. 8 and 9 I have shown still another form of retaining device, and this is the preferred embodiment because of simplicity of construction. The extension 26 in this instance is cast integral with the worm and is provided with a groove 29 in which a spring wire 30, preferably rectangular in cross-section, is placed after the inner cutter has been located on the bearing 27. The dimension of this wire and grooved portion should be greater than the internal diameter of the flange of the inner cutter but less than the internal diameter of the flange of the outer cutter, so that the outer cutter may be located upon the inner one.

In Figs. 10, 11 and 12 there is shown a different form of fastening device for the outer cutter. The retaining device may be made in any of the forms previously described, but for the sake of illustration I have shown it like that in the form of Fig. 7 except that in the place of the nut 22 there is provided a head 31 spaced away from the extension 26 and forming a latch with the catch 32. The catch may be pivoted to the yoke at 33.

In the choppers described the cutters may be adjusted through the nut at the rear end of the worm, but, if desired, the outer cutter may be adjusted relative to the inner cutter through means which secures it in position.

In Figs. 13, 14 and 15 I have shown the invention as applied to choppers of the split hopper type and in connection with different style cutters than those shown in the previously described views. The barrel consists of two halves, 34 and 35, pivoted at 36, one of which is provided with the bail 37 and the other with the stop lug 38, so that the halves may be suitably joined. Each half is grooved at its forward end to accommodate an inner disk 36, and in the form of such chopper now to be found upon the market such inner disk is provided with an inwardly extending lug 37, which is adapted to seat in a corresponding recess formed when the halves of the chopper are assembled to prevent incorrect positioning of the inner disk. In the present invention the formation of this lug 37 may be dispensed with and thus the cost of manufacture of such choppers considerably reduced. The retaining device in this modification of the invention comprises the extension 26 having the bearing 27, either formed integral therewith or as is shown in Fig. 4 of a separate piece of metal and having the forward threaded extremity 38. The usual nut 39 serves to secure the outer rotary disk 40 in position on the flattened portion 21 of the extension 26, so that when the worm rotates this outer disk rotates therewith relative to the inner disk 36, which is held stationary in the grooves of the hopper.

The chopper is placed upon the market with several outer cutter disks having different sized openings through which the food is forced. The edges of these openings form the knives. If for any reason it is desired to remove the inner cutter, this may be accomplished through removal of the retaining device by the use of suitable tools, but ordinarily it is not necessary to remove this inner cutter and I preferably secure the retaining device to the worm permanently.

What I claim is:—

1. In a food chopper, a rotary forcer, and an inner and outer cutter carried thereby, means for securing the inner cutter loosely on the forcer whereby the latter may rotate with respect to such inner cutter, and additional means for holding the outer cutter on the forcer to rotate therewith.

2. In a food chopper having a rotary forcer and operating means therefor, the combination with an outer cutter adapted to rotate with the forcer and an inner cutter adapted to be held stationary with respect thereto, of a retaining device for the inner stationary cutter permanently associating it with the forcer.

3. In a food chopper having a rotary forcer and operating means therefor, the combination with an outer cutter adapted to rotate with the forcer and an inner cutter adapted to be held stationary with respect thereto, of a retaining device for the inner stationary cutter permanently associating it with the forcer and affording a rotative bearing between the forcer and the inner stationary cutter.

4. In a food chopper having a rotary forcer and operating means therefor, the combination with an outer cutter adapted to rotate with the forcer and an inner cutter adapted to be held stationary with respect thereto, of a retaining device for the inner stationary cutter permanently associating it with the forcer and provided with means for locking the outer rotary cutter to said forcer.

5. In a food chopper having a barrel, a rotary forcer and operating means therefor, the combination with an outer cutter adapted to rotate with the forcer and an inner cutter adapted to be locked to the barrel, of a retaining device for the inner cutter permanently associating it with the forcer.

6. In a food chopper having a rotary forcer and operating means therefor, the combination with an outer rotary cutter and an inner stationary cutter, of means for holding the cutters on the forcer, said means comprising an attaching device for the inner cutter carried by the forcer, and a separate attaching device for the outer cutter.

7. In a food chopper having a forcer rotatable therein and operating means therefor, the combination with cutters having holes for fitting them over the forcer of a retaining device having a bearing for one cutter and a portion of larger dimension than the hole in said cutter immediately beyond said bearing to secure that cutter permanently on the bearing, and having also another portion of substantially the same diameter as the hole of the outer cutter, whereby such cutter may be placed in juxtaposition with the first cutter, and means for securing the second cutter to the forcer to rotate therewith.

8. In a food chopper, a rotary forcer comprising a permanently associated loosely mounted cutter which may be held stationary as the forcer rotates, and means for securing said forcer to the cutter comprising an extension integral with the forcer having a portion serving as a bearing between it and said cutter, and having another portion immediately beyond said bearing grooved for the reception and retention of means for holding said cutter on said bearing, and holding means in said groove.

9. In a food chopper, a rotary forcer comprising a permanently associated loosely mounted cutter which may be held stationary as the forcer rotates, and means for securing said forcer to the cutter comprising an extension integral with the forcer having a portion serving as a bearing between it and said cutter, and having another portion immediately beyond said bearing grooved for the reception and retention of means for holding said cutter on said bearing, and a split spring in said groove.

10. In a food chopper, a rotary forcer comprising a permanently associated loosely mounted cutter which may be held stationary as the forcer rotates, and means for securing said forcer to the cutter comprising an extension integral with the forcer having a portion serving as a bearing between it and said cutter and having another portion immediately beyond said bearing grooved for the reception and retention of means for holding said cutter on said bearing, and a spring in said groove having a flat outwardly extending face.

11. In a food chopper, stationary and rotary cutters, a rotary forcer having an extension for the cutters, said extension comprising a bearing portion for the stationary cutter and means to hold said cutter loosely on said bearing, said means comprising an element forming a part of said extension beyond said bearing and having a diameter greater than the diameter of said bearing and engaging the rotary cutter.

12. In a food chopper, a rotary forcer having an extension for cutters, said extension comprising a bearing portion for a stationary cutter and means to hold said cutter loosely on said bearing, said means comprising a spring attached to said extension beyond said bearing and having a diameter greater than the diameter of said bearing.

13. In a food chopper a rotary forcer, a loosely mounted cutter adapted to be held stationary as the forcer rotates, and means for securing such cutter permanently associated with the forcer when the latter is removed from the chopper.

In testimony whereof, I have hereunto set my hand in the presence of witnesses.

CLARENCE SCHOCK.

Witnesses:
  H. M. STAUFFER,
  CHRIST WALTERS.

Copies of this patent may be obtained for five cents each, by addressing the "Commissioner of Patents, Washington, D. C."